United States Patent
Li

(10) Patent No.: US 7,730,869 B2
(45) Date of Patent: Jun. 8, 2010

(54) HOUSING WHEEL ENGINE

(75) Inventor: Yan Li, 40 Belmont St., Malden, MA (US) 02148

(73) Assignee: Yan Li, Winchester, MA (US)

( * ) Notice: Subject to any disclaimer, the term of this patent is extended or adjusted under 35 U.S.C. 154(b) by 126 days.

(21) Appl. No.: 11/786,977

(22) Filed: Apr. 13, 2007

(65) Prior Publication Data

US 2008/0251043 A1 Oct. 16, 2008

(51) Int. Cl.
- *F02B 53/00* (2006.01)
- *F01C 1/00* (2006.01)
- *F04C 18/00* (2006.01)
- *F04C 2/00* (2006.01)
- *F16H 57/08* (2006.01)
- *F16H 37/08* (2006.01)
- *F16H 3/44* (2006.01)
- *F16H 3/74* (2006.01)

(52) U.S. Cl. .................. 123/245; 418/36; 418/34; 475/331; 475/198; 475/269; 475/255

(58) Field of Classification Search .......... 123/200, 123/228, 229, 202, 241, 245; 418/34–38, 418/61.1, 191, 196, 198, 199, 277; 475/275, 475/198, 269, 331; 74/7 E
See application file for complete search history.

(56) References Cited

U.S. PATENT DOCUMENTS

| | | | | |
|---|---|---|---|---|
| 1,370,298 A | * | 3/1921 | Fischer | 418/36 |
| 1,741,865 A | * | 12/1929 | Lyman | 475/255 |
| 1,946,136 A | * | 2/1934 | Farley | 418/36 |
| 1,970,251 A | * | 8/1934 | Rossman | 475/335 |
| 1,973,397 A | * | 9/1934 | Stromberg | 418/36 |
| 2,362,550 A | * | 11/1944 | Hansen | 418/36 |
| 2,731,000 A | * | 1/1956 | Pelhat | 123/245 |
| 2,760,466 A | * | 8/1956 | Black, Jr. | 123/228 |
| 3,476,056 A | * | 11/1969 | Bright | 418/36 |
| 3,526,147 A | * | 9/1970 | Baker | 475/29 |
| 3,645,239 A | * | 2/1972 | Cena | 123/245 |
| 3,737,000 A | * | 6/1973 | Knobloch et al. | 475/269 |
| 3,744,938 A | * | 7/1973 | Matvey | 418/36 |
| 3,776,202 A | * | 12/1973 | Mesa | 418/36 |
| 3,822,971 A | * | 7/1974 | Chahrouri | 418/36 |
| 3,990,405 A | * | 11/1976 | Kecik | 418/36 |
| 4,068,985 A | * | 1/1978 | Baer | 418/36 |
| 4,319,551 A | * | 3/1982 | Rubinshtein | 123/245 |
| 4,553,503 A | * | 11/1985 | Cena | 418/34 |
| 5,304,048 A | * | 4/1994 | Huang | 418/36 |
| 5,740,765 A | * | 4/1998 | Ball et al. | 418/36 |
| 6,036,461 A | * | 3/2000 | Bahniuk | 123/245 |
| 6,739,307 B2 | * | 5/2004 | Morgado | 123/245 |
| 6,849,023 B1 | * | 2/2005 | Kerr | 475/198 |
| 7,255,086 B2 | * | 8/2007 | Kovalenko | 123/245 |
| 7,258,082 B2 | * | 8/2007 | Huettlin | 418/36 |
| 2005/0132828 A1 | * | 6/2005 | Cilibraise | 74/7 E |
| 2007/0202986 A1 | * | 8/2007 | Kotani et al. | 475/331 |

FOREIGN PATENT DOCUMENTS

| | | | |
|---|---|---|---|
| DE | 4225932 A1 | * | 2/1994 |
| EP | 559626 A1 | * | 9/1993 |
| WO | WO 9001676 A1 | * | 2/1990 |

* cited by examiner

Primary Examiner—Thai Ba Trieu

(57) ABSTRACT

Disclosed herein is a housing wheel engine that has a wheel shaped combustion housing, the housing wheel engine can hold several pistons which both sides working inside the combustion housing. The housing wheel engine transfers its rotating movement directly to the driveshaft by the planetary gearsets. A four-stroke time mechanism provided by the planetary gearsets.

6 Claims, 12 Drawing Sheets

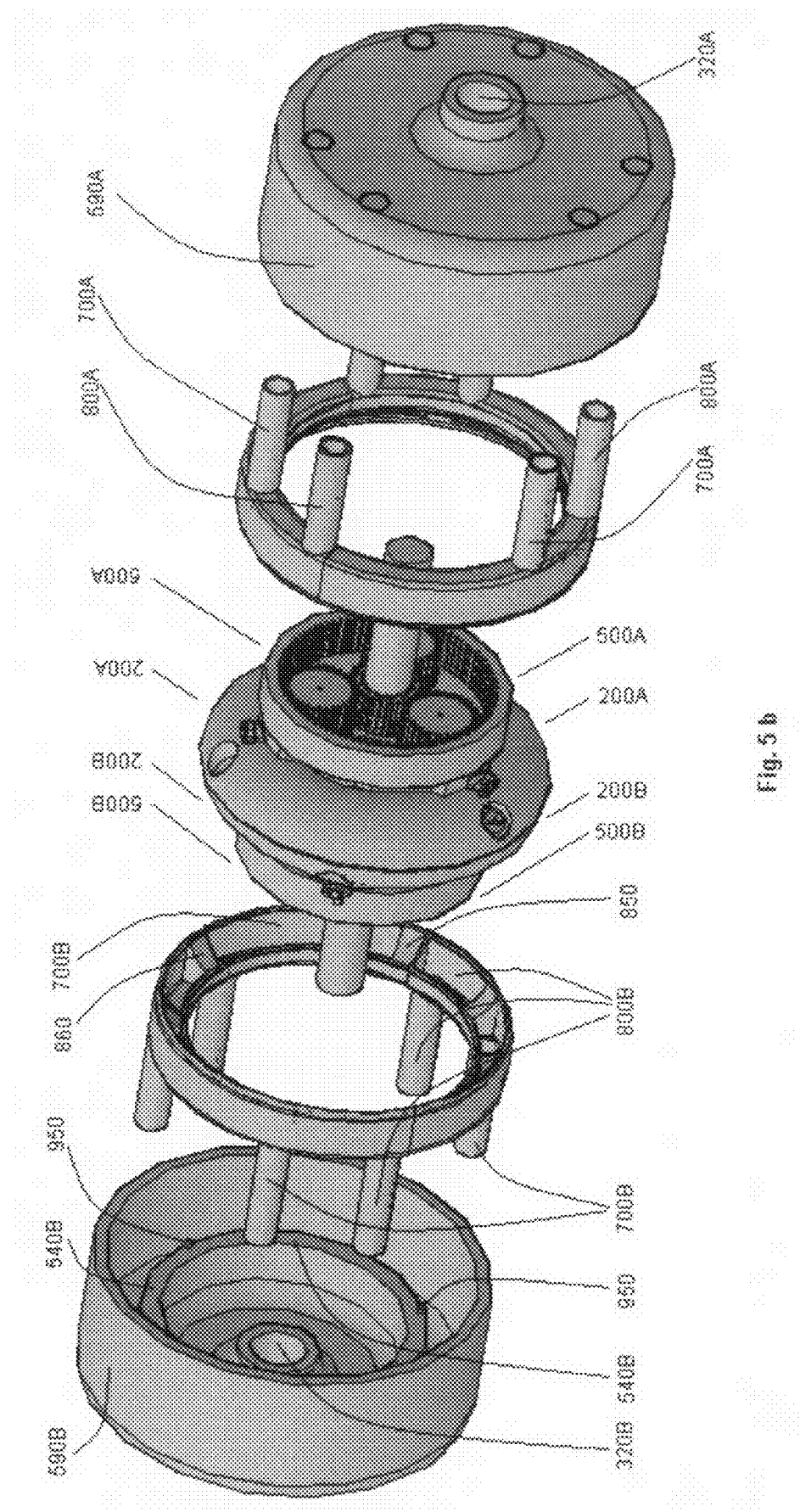

US 7,730,869 B2

HOUSING WHEEL ENGINE

BACKGROUND

A reciprocating engine has two different movements in the running, which are a piston's back and forth linear motion and flywheel's rotating motion. The crankshaft is an intermediate been used to convert these two movements each other. The engine also needs a complicated timing system working together with pistons and crankshaft to complete four strokes.

The piston has two functions in the engine. First, the piston getting gas power by the one end which works within combustion housing to complete four strokes cycle; second, the another end of piston link to the crankshaft by connecting rod in order to transfer piston's reciprocating motion to flywheel's rotating motion. Each cylinder holds only a combustion housing that piston works within. Usually the multiple cylinders are needed in an engine for increasing the engine power and decreasing vibration.

SUMMARY OF THE INVENTION

In one embodiment, a pair set of planetary gearsets and each having a fixed big ring gear, and plurality of rolling gears, and one sun gear formed therein. Each of the rolling gears having an eccentric pin, which having eccentricity d from the axis of the rolling gear, mounted on; The eccentric pins having hypocycloid running curve when the rolling gears roll inside of the ring gear. The sun gear has a spline hole located at the axis.

A housing wheel formed by a pair of housing wheel halves, which each having a housing ring half, plurality of pistons, plurality of spokes, and a hub formed therein. The plurality of spokes mounted on housing ring half evenly with one end, and another end mounted on the hub to form a housing wheel half. The plurality of pistons mounted inside of the housing ring half. Each of the spokes has a linear slot.

A cylindrical driveshaft having two splines formed therein.

A pair set of planetary gearsets join with a pair of housing wheel halves by fitting the eccentric pin (which is on rolling gears) inside of the slot (which is on spokes) respectively.

The housing wheel locates on the middle of the driveshaft between the two of splines, and is able to spin freely around the driveshaft. A pair of planetary gearsets locates on the two splines of the driveshaft by the two sun gears respectively.

The big ring gears are fixed in the big ring gear bases, which are located in side of the engine cover, to hold the planetary gearsets with the engine. The driveshaft is holed by bearing supports, which are located on the ends of the engine cover, to transfer the output of engine power.

The housing wheel transfers its rotating movement directly to the driveshaft by a pair of planetary gearsets.

A pair of planetary gearsets provides a four-stroke time mechanism to the engine.

DETAILED DESCRIPTION OF THE INVENTION

This invention discusses of the engine which does not need crankshaft to transfer the movement from reciprocating to rotating, and does not need complicated time system to complete four strokes cycle, and instead of those is a pair of planetary gearsets, which works on the theorem of the hypocycloid. And also this engine has a wheel shaped combustion housing and it can hold several pistons, which both sides working inside of the combustion housing. And this housing wheel transfers its rotating movement direct to the driveshaft by the planetary gearsets. The engine is relatively simple, and it has high power density, a wide speed range, and it is less vibration.

Principle of the Hypocycloid

Here is the definition of the hypocycloid: A hypocycloid is a roulette trace by a point P attached to a circle of radius r rolling around inside of a fixed circle of radius R, where P is a distance d from the center of the interior circle, and θ is the angle that the center of rolling circle to the X axle (see FIG. 3 *a*). The equations are $$x=(R-r)\cos\theta+d\cos((R-r)/r\cdot\theta) \quad (1.1)$$

$$y=(R-r)\sin\theta-d\sin((R-r)/r\cdot\theta) \quad (1.2)$$

The curve will be closing when R/r is a rational number.

The value of R/r this invention chose is a rational number so that it makes a closing curve. Also it is necessary to chose R/r>2 (It is untenable in this invention when R/r=2!).

This article will discuss the case R/r=4 and case R/r=3. Other cases, which are R/r>4, will be similar to these two cases. I using symbol $R_r4$ and $R_r3$ to simple the formula R/r=4 and R/r=3 below.

The Cases of the $R_r4$ and the $R_r3$ Engines

Figure 1:
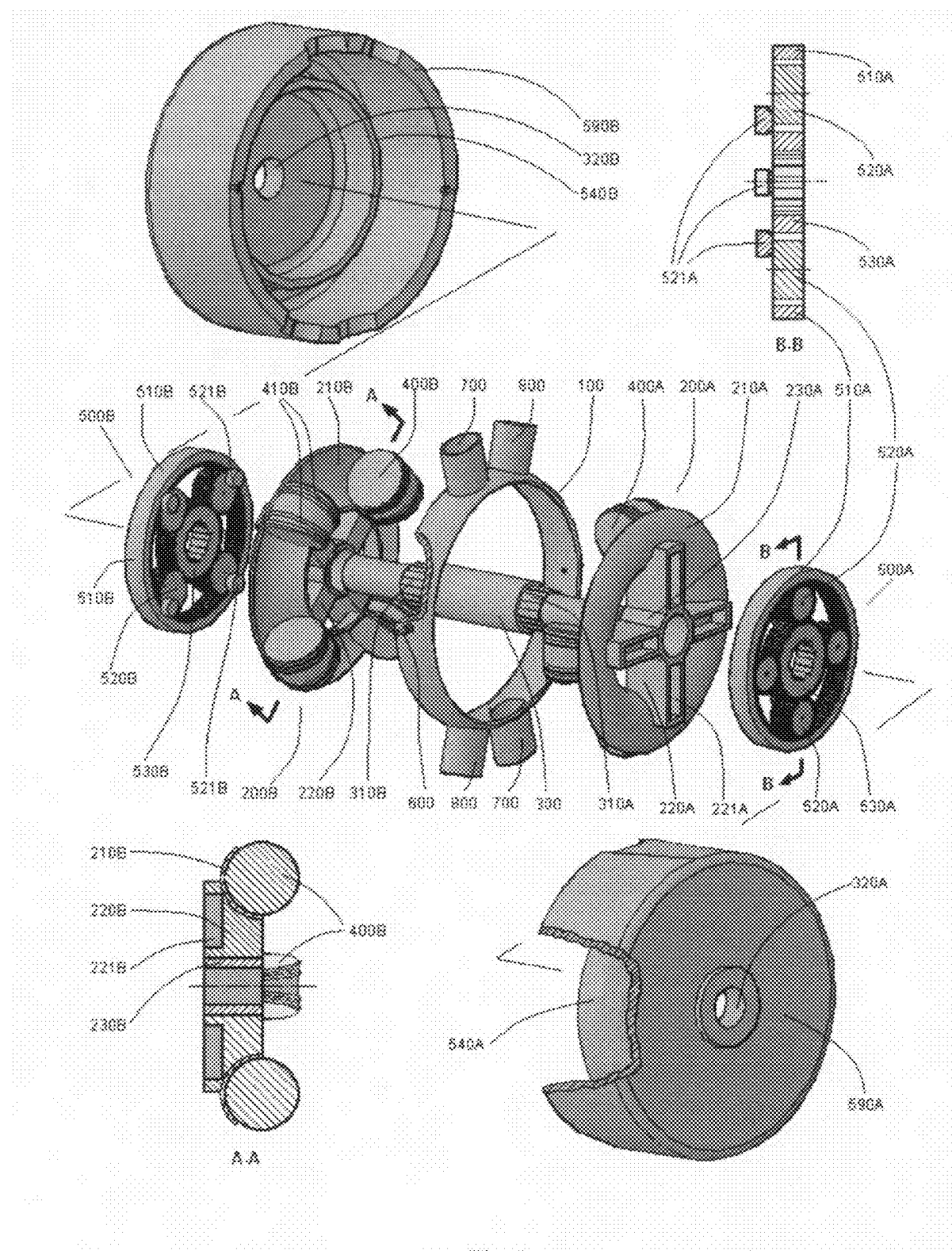
FIG. 1 is an exploded perspective view of the $R_r4$ housing wheel engine.

FIG. 1 is an exploded perspective view of the housing wheel engine (This is an $R_r4$ case). The housing wheel formed by a toroidal housing ring 100, which opening angle is t (FIG. 2 *a*), and two of the same housing wheel halves 200A-B. The housing wheel half 200A (or 200B) formed by a housing ring half 210A (or 210B), 4 spokes 220A (or 220B), and a hub 230A (or 230B). The one end of the 4 spokes 220A (or 220B) evenly mounted on the housing ring half 210A (or 210B), and another end evenly mounted on the hub 230A (or 230B). There are 4 pistons 400A (or 400B) mounted inside of the housing ring half 210A (or 210B) and situated on at the long axis of the spokes. Each of the spokes has a linear slot 221A (or 221B), which is using to connect with the planetary gearset 500A (or 500B) by fitting the eccentric pin 521A (or 521B) inside. The two housing wheel halves 200A-B deposited face to face each other, and interlace pistons 400A-B each other to form a whole housing wheel. The two sets of interlaced pistons 400A-B form eight combustion chambers inside of the whole housing wheel, and the volume of the combustion chamber are variable when two housing wheel halves oscillatory each other on the driveshaft 300. The driveshaft 300 is hold and fluid on two ends by the journal bearings, which sited in bearing supports 320A-B that located on the end of the engine cover 590A-B. The toroidal housing ring 100 holds the intake manifolds 700A-B, the exhaust manifolds 800A-B, and the spark plugs 600.

Figure 2:
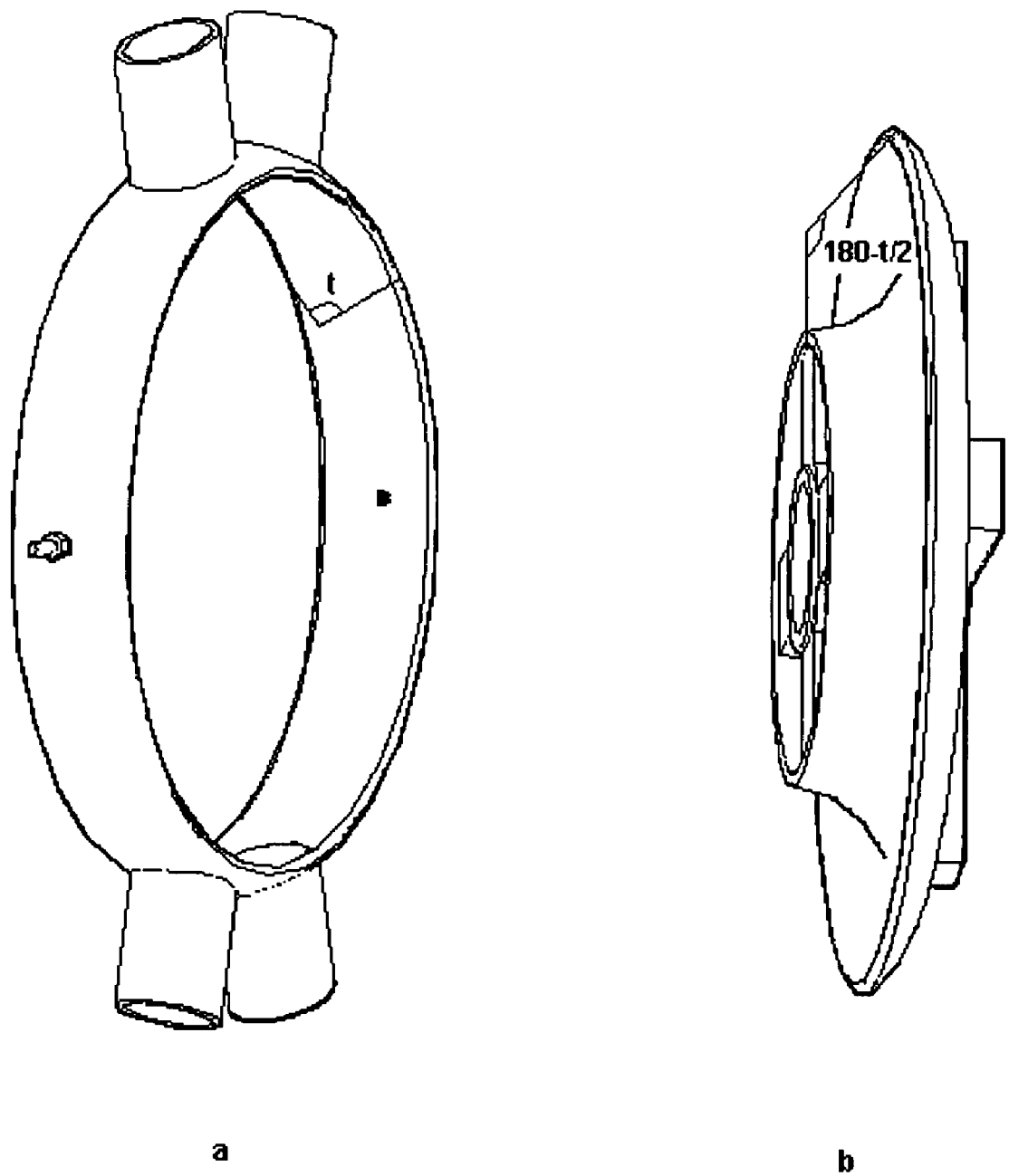
FIG. 2 shows the opening angle on the toroidal housing ring and housing ring halves.

The pistons 400A-B mounts inside of the housing ring halves 200A-B with an angle $180°-t/2$ (see FIG. 2$b$). The rest of the circle has an angle $180°+t/2$ that will be the working angle of the piston seals 410A-B. The opening angle t of the toroidal housing ring defines the working angle of the piston seal. The piston seals will have only 180° working angle if toroidal housing ring can be take off. This case will discuss in another embodiment later.

There are two of the same planetary gearsets 500A-B and each one works with a housing wheel halves 200A-B separately. The planetary gearset formed by one big ring gear 510A (or 510B), four rolling gears (or called planet gears) 520A (or 520B) and a sun gear 530A (or 530B). The ring gear is fixed on the ring gear base 540A (or 540B), which located inside of the engine cover 590A (or 590B). The sun gear fixed on the driveshaft 300 with the splines 310A (or 310B) and transfers the movement between the rolling gears 520A (or 520B) and the driveshaft 300. The four rolling gears 520A (or 520B) are evenly located and are able to roll inside of the ring gear 510A (or 510B). And there is an eccentric pin 521A (or 521B), which is d distance from the axis of rolling gear 520A (or 520B), fixed on each of the rolling gear by symmetrical about the axis of the ring gear 510A (or 510B). The eccentric pins 521A (or 521B) run on a hypocycloid curve when the rolling gears 520A (or 520B) roll inside the ring gear 510A (or 510B). The eccentric pins 521B (or 521A) on second planetary gearset 500B (or 500A) will run on the exactly the same hypocycloid curve as the first planetary gearset 500A (or 500B), but they have an angle 45° situated each other. The planetary gearsets 500A (or 500B) working with the housing wheel halves 200A (or 200B) by fit the eccentric pins 521A (or 521B) inside the slots 221A (or 221B), which located on the spokes 220A (or 220B). So two housing wheel halves 200A-B will have an angle 45° each other too.

Figure 3:
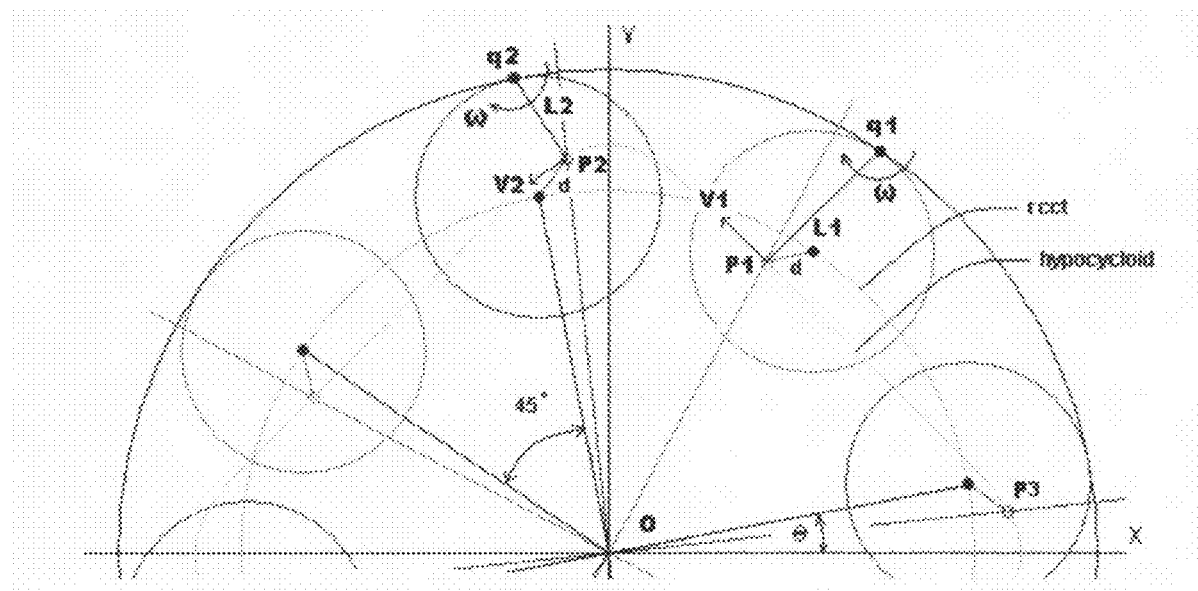
FIG. 3 *a-b* are schematic end elevation views of a planetary gearset works within the $R_r4$ engine and components representative.
Figure 3:
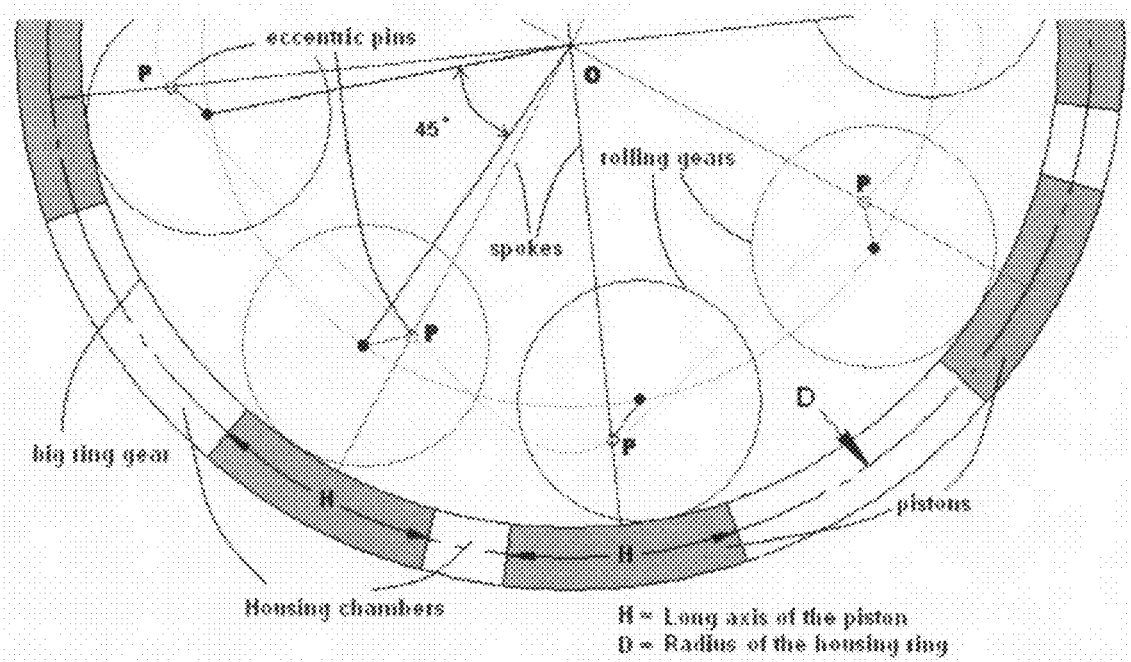

FIG. 3 $a$-$b$ are schematic end elevation views of a planetary gearset works within the $R_r$4 engine and components representative. The equations are (assume r=1)

$$x=3\cos(\theta)+d\cos(3\theta) \quad (2.1)$$

$$y=3\sin(\theta)-d\sin(3\theta) \quad (2.2)$$

Assume the point P, which is a d distance from the center of the rolling circle, represents the eccentric pin 521A-B on the rolling gear 520A-B. The radius O-P, which links from center of the fixed circle O to the point P, represents spokes 220A-B on the housing wheel halves 200A-B. Two sets of the rolling circles have an angle 45° differential. This angle differential will make the things happen that when two sets of rolling circles roll inside the fixed circle, the one set of Ps always situate on the different side of the trace circle rcct of the rolling circle's center with another set of Ps. The velocity V of point P is a vector that the value is $$V=L\cdot\omega$$

Here L is the length of the radiate from P to the tangent point q; ω is the uniform angular velocity of the rolling circle.

So two set of the Ps have two different velocities since they sit on the different side of the trace circle rcct and have different Ls, the Ps that sit inside of the trace circle have faster speed, and the Ps that sit outside the trace circle have lower speed. They have the same speed when they both got on the trace circle.

This motion pattern leads $P_1$ speeds up and $P_2$ slows down when $P_1$ gets inside of the trace circle rcct, and $P_2$ gets outside of the trace circle rcct. It makes $P_1$ approaching to $P_2$. Or $P_1$ slows down and $P_2$ speeds up when $P_1$ gets outside of the trace circle rcct and $P_2$ gets inside of the trace circle rcct. It makes $P_1$ departing from $P_2$. $P_1$ and $P_2$ have either minimum space or maximum space between each other when both of them get on the trace circle rcct. It is easier to figure out the minimum angle δ and maximum angle Δ between $P_1$ and $P_2$ are:

$$\delta=\pi/4-2d/3r \quad (3.1)$$

$$\Delta=\pi r/4+2d/3r \quad (3.2)$$

The equations 3.1 and 3.2 show δ and Δ are determined by the eccentricity d.

FIG. 3 $b$ shows the components representative on FIG. 3 $a$. We also can figure out by FIG. 3$b$, the minimum space $S_{min}$, and maximum space $S_{max}$ between two each other of the neighbor pistons are:

$$S_{min}=D\delta-2H \quad (4.1)$$

$$S_{max}=D\Delta-2H \quad (4.2)$$

The equations 4.1 and 4.2 show the minimum space $S_{min}$ and maximum space $S_{max}$ determined by the eccentricity d of the eccentric pins, and the long axis H of the pistons. In another word the eccentricity d and long axis H determine the compression rate and displacement of the engine.

Figure 4:
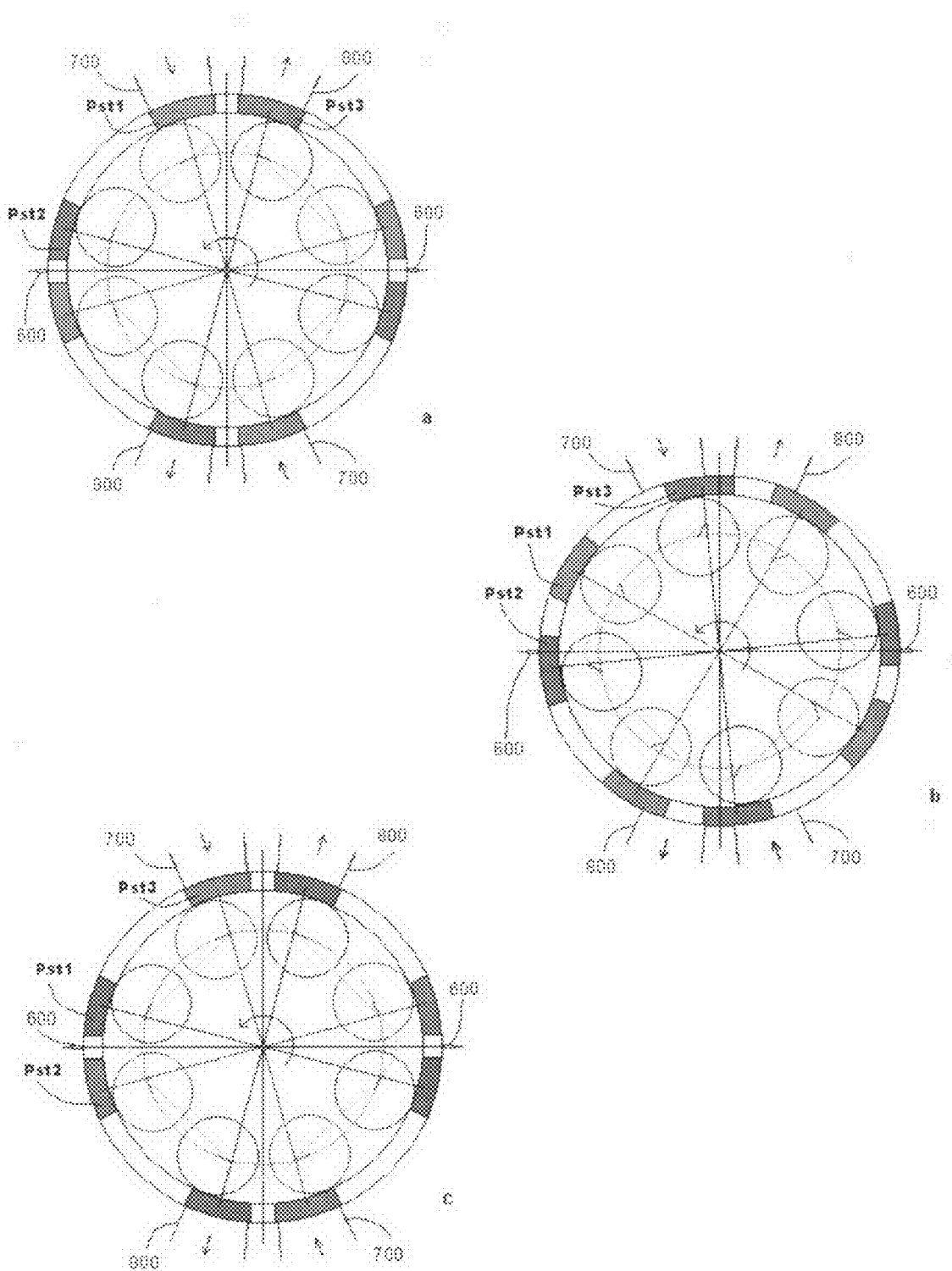
FIG. 4 *a-f* are schematic views which shows that the detail of how the engine completes the cycle of the four strokes.
Figure 4:
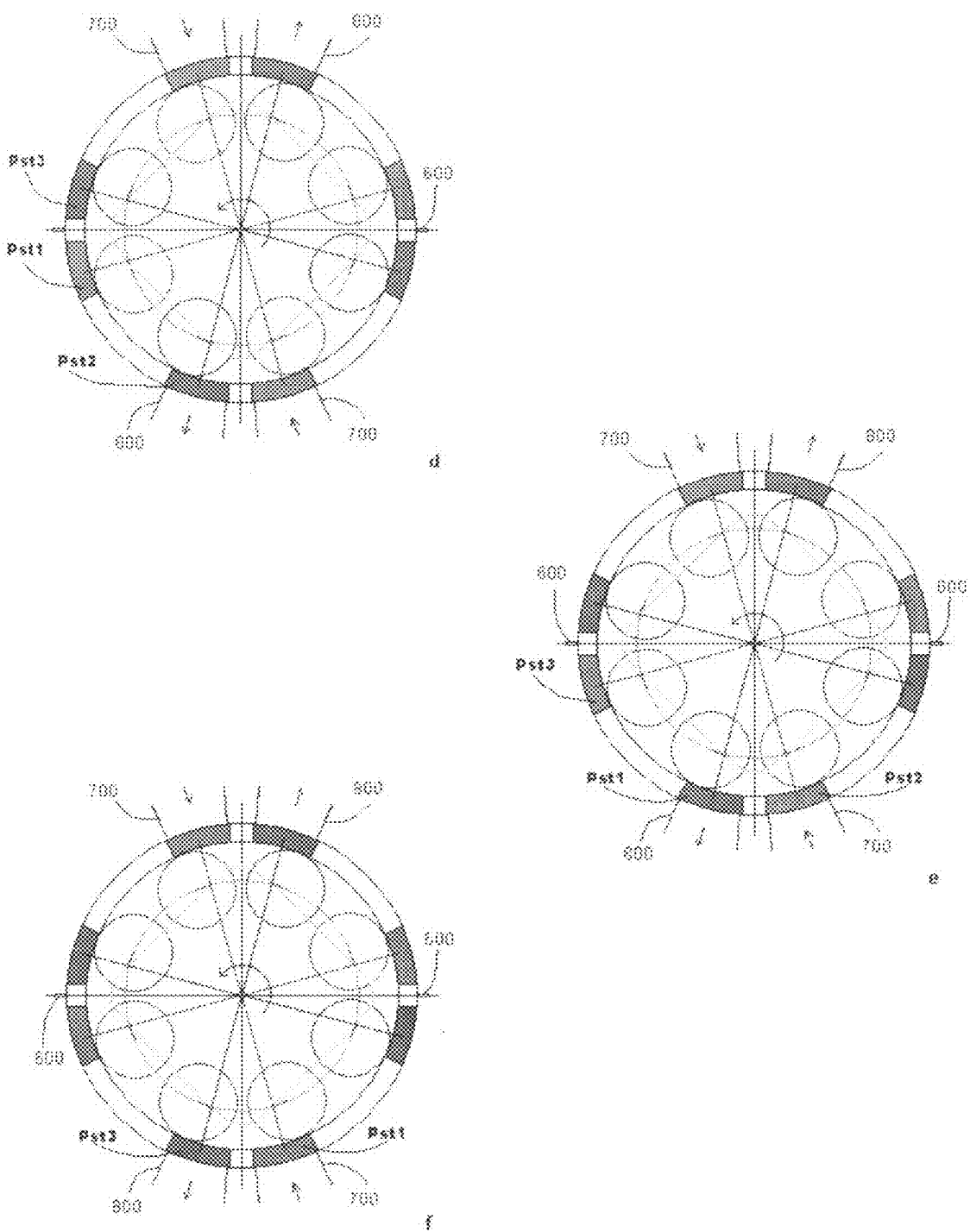

FIG. 4 $a$-$f$ are schematic views which show that the detail of how the engine completes the cycle of the four strokes. Assume the housing wheel spins with anti clockwise, and the combustion chamber that is between the piston Pst1 and the piston Pst3, just finished the exhaust process and is going to start the next intake process. The piston Pst1 has the minimum space with the piston Pst3 in this moment, and the piston Pst1 just covered the intake manifold 700A-B, and the piston Pst3 covered the exhaust manifold 800A-B (FIG. 4 $a$). Then the piston Pst1 starts to move away from the piston Pst3 faster and opens the intake manifold 700A-B to vacuum air fuel mixture into combustion chamber (simultaneously the another side of the piston Pst1 starts to do compression process with the piston Pst2). Meanwhile the piston Pst3 moves forward slowly and keeps the intake manifold 700A-B still open (FIG. 4 $b$). This intake process will complete when the piston Pst1 gets the maximum space from the piston Pst3 and the intake manifold 700A-B just be covered completely by the piston Pst3 (FIG. 4 $c$). Next compression process is going to start, at this time the piston Pst1 becomes moving forward slowly, and the piston Pst3 becomes moving faster to approaching the piston Pst1, and starts to compress the air fuel mixture (simultaneously the another side of the piston Pst3 starts to do intake process). This process will complete when the piston Pst1 gets the minimum space with the piston Pst3 (FIG. 4 $d$). Then the combustion process is going to start at this moment, the spark plug 600 supplies the spark that ignites the air fuel mixture so that the combustion can occur. Meanwhile the piston Pst1 starts to move away from the piston Pst3 faster (simultaneously another side of the piston Pst1 starts to do exhaust process with the piston Pst2) and the piston Pst3 moves forward slowly. The gas power goes through the piston Pst1, the spokes 220A-B, the eccentric pins 521A-B and the rolling gears 520A-B's movement transfers to the driveshaft 300 within this process. This process will complete when the piston Pst1 just moves on the exhaust manifold 800A-B and covered it completely (see FIG. 4 e). The last exhaust process will start from here. The piston Pst1 starts to move away from the exhaust manifold 800A-B and keeps it open so that the waste can be exhausted. The piston Pst3 starts to move faster to close to the piston Pst1 in order to push the waste out (simultaneously another side of the piston Pst3 starts to do combustion process.) (FIG. 4 e). Finally the whole four strokes complete when the piston Pst1 and the piston Pst3 simultaneously moved on and covered the intake manifold 700A-B and the exhaust manifold 800A-B respectively (FIG. 4 f). The combustion chamber between the piston Pst1 and the piston Pst3 has been moved 180° angles inside the left part of the housing wheel 200A-B. It will continue goes on to the right side and doing the same circulation. So the combustion chamber between Pst1 and Pst3 will get twice ignitions when it finished circulations on whole housing wheel (360° angles). Obviously 8 combustion chambers will get 16 ignitions when they complete a whole housing wheel circulation.

This engine does not need valves, valve train and camshaft. It is simple in structure. The intake manifolds 700A-B, the exhaust manifolds 800A-B and the spark plugs 600 sit on the proper position of the toroidal housing ring 100, which is a fixed partial of the housing wheel. Two housing wheel halves 200A-B and a toroidal housing ring 100 together form a whole housing wheel. The toroidal housing ring 100 cannot be moving, it is doing like a cylinder-head in reciprocating engine, so it is using for holding the intake manifolds 700A-B, the exhaust manifolds 800A-B and the spark plugs 600 or the fuel-injected plug (that is not show in the FIG. 1). In order to distinguish the different embodiment will be discuss in this invention later on, I might call this first embodiment ΦI, which comes with the toroidal housing ring.

The advantages of the first embodiment are high power density; lower vibration; simple in structure and suitable for diesel engine. The weaknesses are the piston rings 401A-B run on a multi-holes surface, which are the intake manifolds 700A-B, the exhaust manifolds 800A-B and the spark plugs 600. And also this embodiment can only be used when the $R_r$ is an even number.

This article will discuss second embodiment (call it ΦII) to improve it in next section.

Second Embodiment ΦII

For $R_r$3 case the equations to form a hypocycloid curve are: (assume r=1)

$$x = 2\cos(\theta) + d\cos(2\theta) \quad (5.1)$$

$$y = 2\sin(\theta) - d\sin(2\theta) \quad (5.2)$$

Figure 5A:
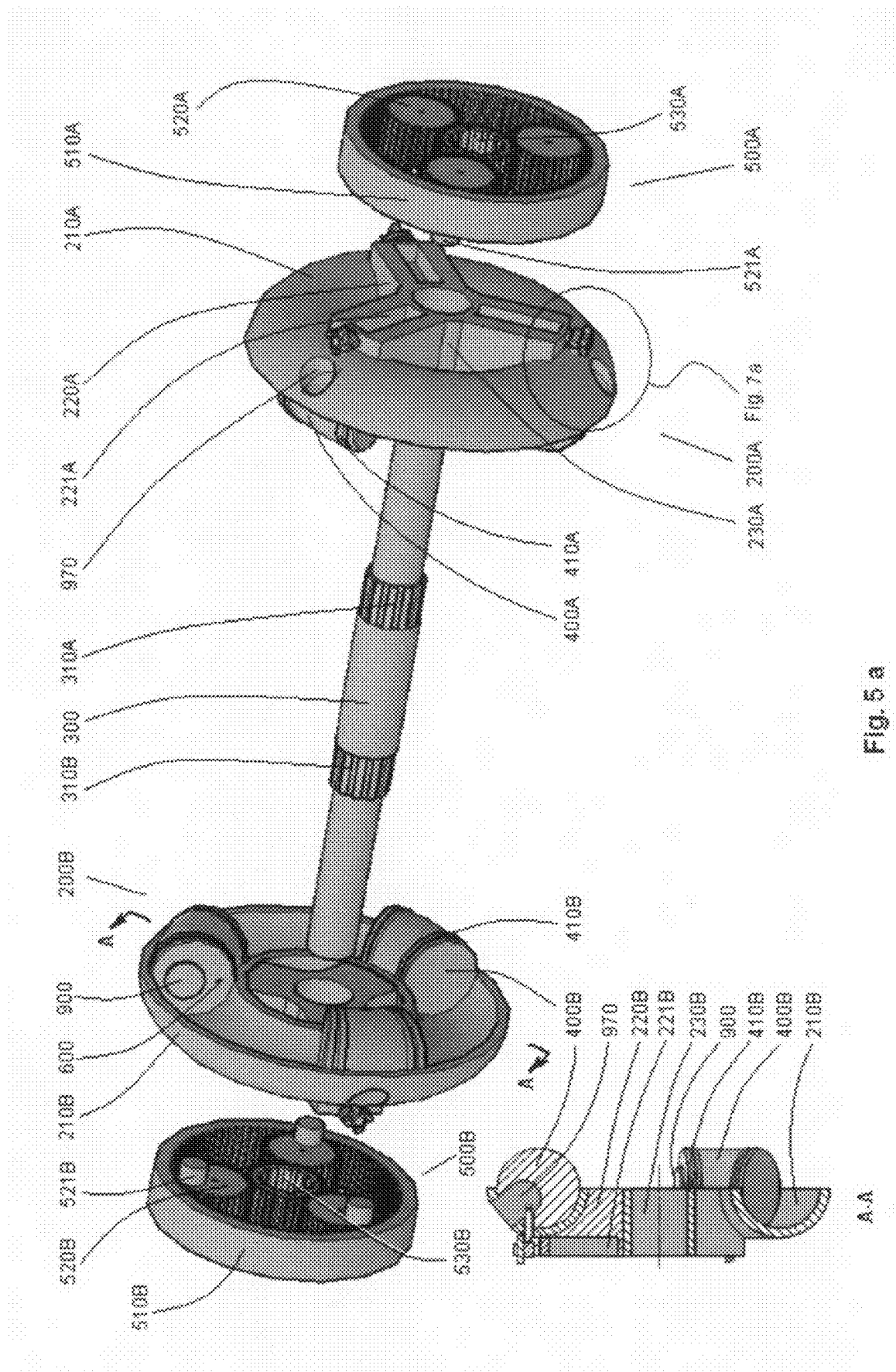
FIG. 5 *a-b* are exploded perspective views of the $R_r3$ housing wheel engine.

FIG. 5 is an exploded perspective views of the $R_r$3 engine. Similar as the $R_r$4 engine, the $R_r$3 engine formed by two housing wheel halves 200A-B, two sets of planetary gearsets 500A-B and a driveshaft 300.

The housing wheel half has 3 hollow pistons (see detail in the FIG. 7a) 400A (or 400B), evenly mounted inside of the housing ring half 210A (or 210B); and locate on the long axis of the spokes 220A (or 220B). The $R_r$3 engine does not need toroidal housing ring 100.

The planetary gearset 500A (or 500B) has a big ring gear 510A (or 510B), 3 rolling gears 520A (or 520B) and one sun gear 530A (or 530B). The radiate R of the ring gear 510A (or 510B) is 3 times radiate r of the rolling gears 520A (or 520B), which the $R_r$3 is R/r=3. There is an eccentric pin 521A (or 521B) mounted on each of the rolling gear 520A (or 520B), and d eccentricity from the axis of the rolling gear 520A (or 520B). 3 rolling gears 520A (or 520B) sit inside of ring gear 510A (or 510B) symmetrically about the axis.

In general, the numbers of the pistons 400A (or 400B), the spokes 220A (or 220B), and rolling gears 520A (or 520B) are matching the number $R_r$, which is 3 now.

Same as $R_r$4 engine set the first set of planetary gearset 500A with first housing wheel half 200A. The fixed ring gear 510A on the ring gear base 540A. Mount the sun gear on the driveshaft 300 with the splines 310A. Put three rolling gears located inside of the ring gear 510A symmetrical about the axis of the ring gear, and put eccentric pins 521A into the slots 221A of the spokes 220A. The trace of the eccentric pins is a hypocycloid curve when rolling gears 520A roll inside the ring gear 510A. Set second set of planetary gearset 500B with second housing wheel half 200B the same as first one, and then roll it an angle 60° (in general this differential angle is $180°/R_r$). Two housing wheel halves 200A and 210B will have a differential angle 60° each other.

Figure 6:
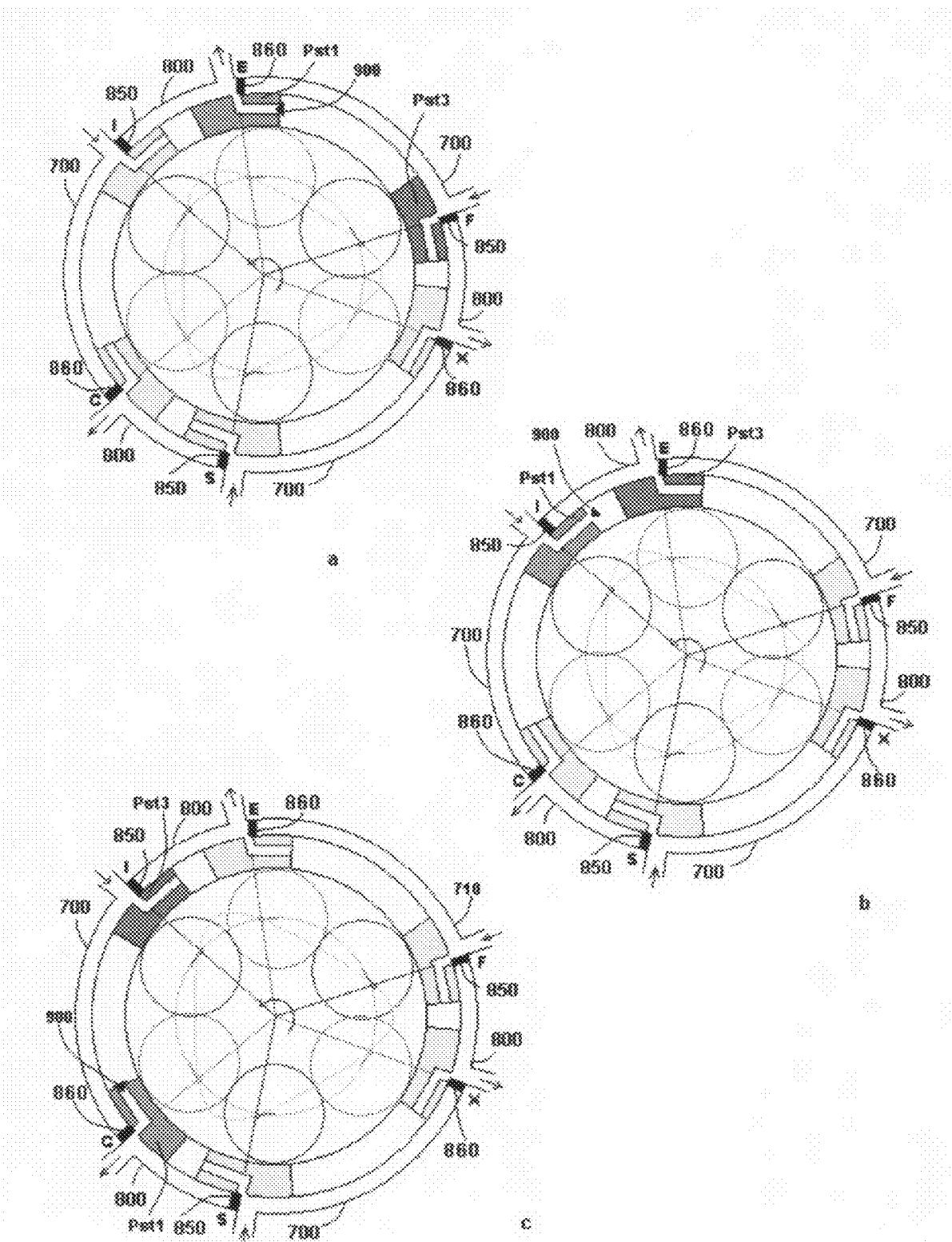
FIG. 6 *a-e* are schematic views, which shows the detail of how the combustion chamber works with the valve system in four strokes.
Figure 6:
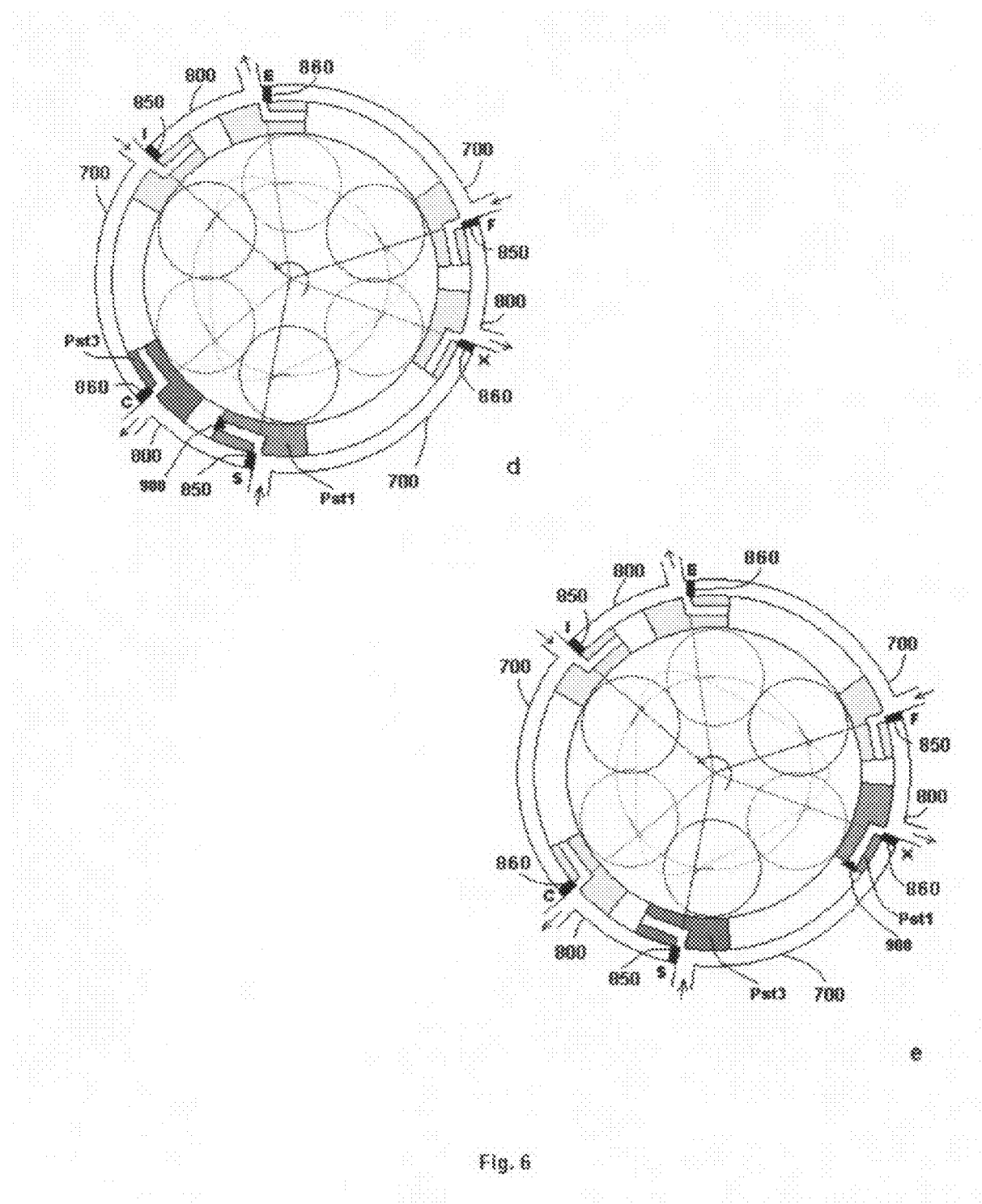

FIG. 6 a-e shows the detail of $R_r$3 engine how to works. The trace of center of the rolling circle rcct has 6 intersects with hypocycloid curve, and they determinate the minimum space and maximum space between the any two neighbor radius which represent to spokes 220A-B. If we start intake cycle from point I, the four strokes cycle will be complete at point F, it takes combustion chamber moving 240° angles inside the housing wheel 200A-B. Then the intake cycle will start again at F, but the rest of the space inside of the housing wheel is only 120°, it is not enough for completing the next four strokes cycle. That means the intake manifold and exhaust manifold cannot be stationary as usual, they have to move with pistons.

Figure 7:
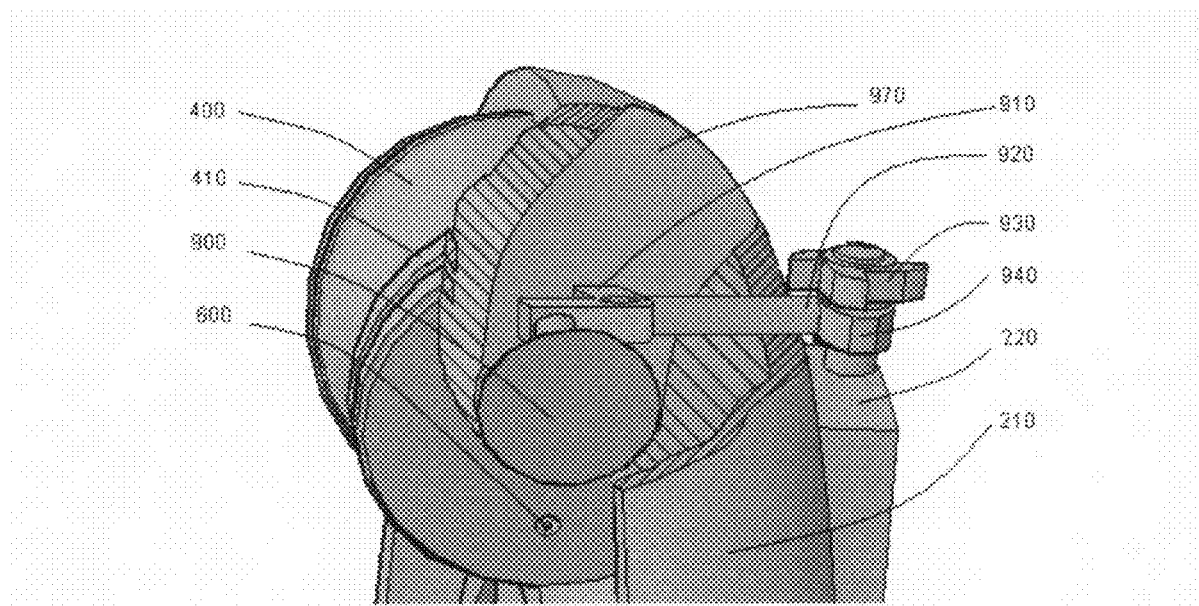
FIG. 7 *a-b* are exploded perspective views which show the hollow piston and the valve system.
Figure 7:
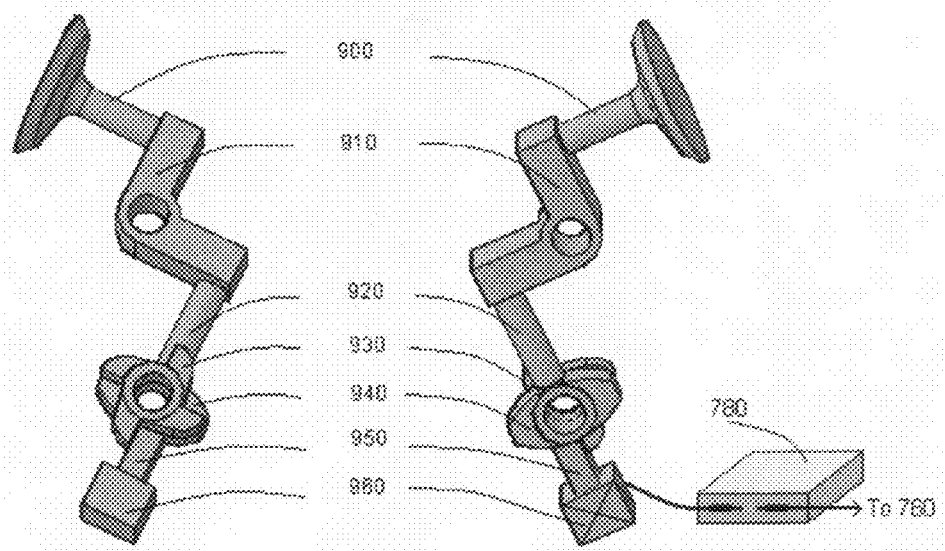

Here is the way to solve this problem. See the FIG. 7 a-b. There is an air tunnel 970 which goes through one end of the piston 400A (or 400B), and out from the wall of the housing ring half 210A (or 210B) (FIG. 7a). A valve 900A (or 900B) located at an end of the piston 400A (or 400B) to open or close the air tunnel 970A (or 970B), the air tunnel's opening or closing depends on the position of the hollow pistons where they at are. The valve 900A (or 900B) controlled by a cam wheel 940A (or 940B), a rod 920A (or 920B), and a rocker 910A (or 910B) (see FIG. 7 a-b). The cam wheel 940A (or 940B) is mounted on with a ratchet wheel 930A (or 930B). The ratchet wheel turns 90° angles each time when a trigger 950A (or 950B) triggers it, so the cam wheel 940A (or 940B) has the same movement as the ratchet wheel. The each cam's turning keeps the valve 900A (or 900B) in certain saturation either opening or closing the air tunnel 970A (or 970B). So, it needs to be triggered only if the situation of the valve needs to be change (from opening to closing or reverse) when the hollow pistons gets a new position.

FIG. 6 a-e are schematic views which shows the combustion chamber works with the valve system. Let's start it from exhaust cycle. Assume the valve 900A (or 900B), which is on the piston Pst1 was closed before. There is a trigger 950A (or 950B) sites on the point E, which will change the valve from closing to opening when the piston Pst1 moves through E (FIG. 6 a). After this point, the piston Pst1 starts to move slowly and the piston Pst3 starts to move faster to approach piston Pst1 in order to do exhaust. The exhaust cycle will complete when piston Pst1 gets the point I and the piston Pst3 gets the point E (FIG. 6 b). Then next intake cycle is going to start. The valve on the piston Pst1 still opened since there is no trigger at the point Ito change its situation. So it's ready to start intake cycle. The piston Pst1 will move faster away from the piston Pst3, and vacuums the gas in to the combustion chamber. The intake cycle will finish when the piston Pst1 gets the point C and the piston Pst3 gets the point I. There is another trigger sites on the point C and it will turn the valve from opening to closing (FIG. 6 c). After that, the compression cycle will start. Since that time the piston Pst1 moves forward slowly and piston Pst3 moves faster to approach the piston Pst1 this makes compression cycle to start. The compression cycle will be finished when the piston Pst1 moves on at the point S and the piston Pst3 moves on at the point C respectively (FIG. 6 d). The piston Pst1 still keeps the valve closing since there is no trigger site on the point S. After that point the spark plug 600 (shows on FIG. 7a) ignites the compressed gas and combustion cycle is going to start. Then piston Pst1 faster moves away from the piston Pst3. When the piston Pst1 gets the point X the combustion cycle is complete (FIG. 6 e). There is an another trigger sites on point X, which will turn the valve from closing to opening, and the exhaust cycle will start again.

Figure 8:
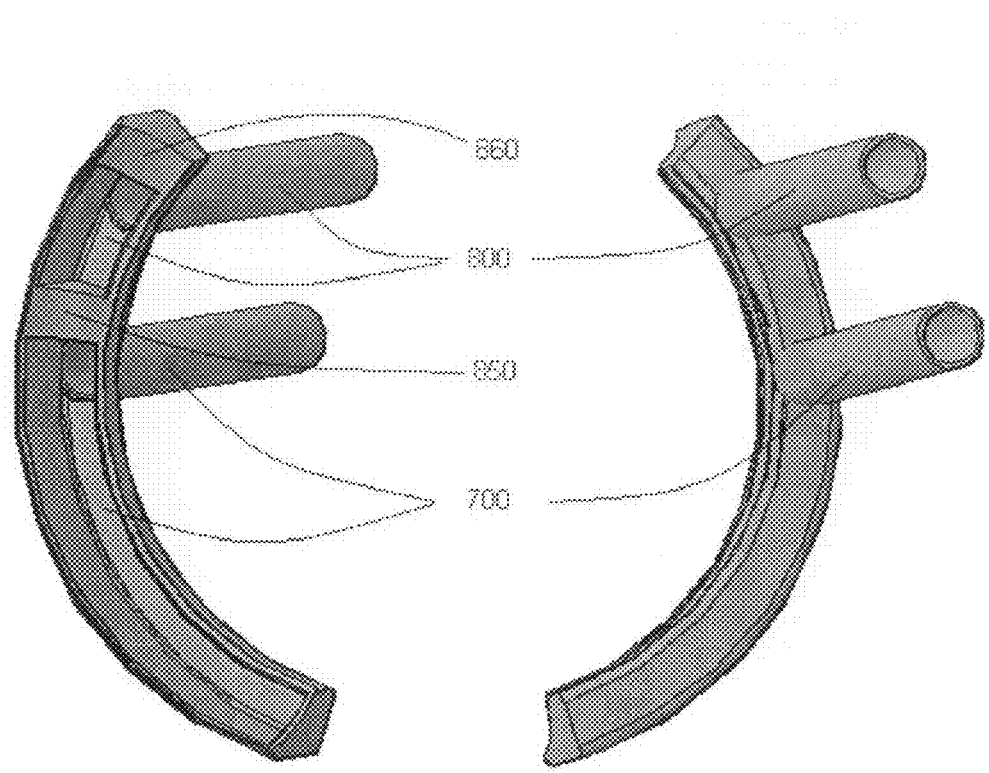
FIG. 8 is an exploded perspective view of an intake-exhaust manifold.

The air tunnels 970A (or 970B) runs together with housing wheel. It has two functions: Intake and Exhaust. When the function does as exhaust manifold, it must be start at the point E, X or C. And when the function does as intake manifold, it must be start at the point I, S or F. There are three exhaust manifolds 800A (or 800B) located at the position E, X and C. and three intake manifolds 700A (or 700B) located at the position I, S and F. FIG. 5 b and FIG. 8 show how the intake manifolds 700A-B and exhaust manifolds 800A-B are formed. FIG. 8 is also a perspective view of an intake-exhaust manifold which has an intake manifold 700A-B and an exhaust manifold 800A-B. The intake manifolds 700A-B and exhaust manifolds 800A-B separated by intake-block 850. The size of the intake-block 850 and exhaust-block 860 should bigger enough to cove the air tunnel 970.

The spark plug 600 is located at the same end of the piston with valve 900.

It is no more need the toroidal housing ring 100 to hold the intake-exhaust manifolds (700A-B and 800A-B) and ignition spark plugs 600, and instead of that is the hollow piston 400A-B integrating all the functions of the toroidal housing ring. Therefore all the holes formed by intake-exhaust manifolds and spark plugs are all located inside of pistons 400A-B. So the piston rings 410A-B do not run on multi holes surface any more. The working angles of the piston seals are:

180°+t/2, if the toroidal housing ring still be adopted, but does not for holding intake-exhaust manifolds and spark plugs; or 180° if the toroidal housing ring no more be using.

The weaknesses of ΦII are: The ignition system using in ΦII is different with regular ignition system; the advantages are: Suitable for any engines which $R_r$>2; the piston rings run on sleek surface; easier to do motion control.

Motion Control on ΦII

Here the motion control means the combustion chambers can be controlled as either in working state or un-working state.

The case discussed above was a working state. In that case all 6 combustion chambers were in working state. For un-working state, the way how to do it is: Make the combustion chamber, which will be in un-working state, open directly outside of the engine.

Figure 9:
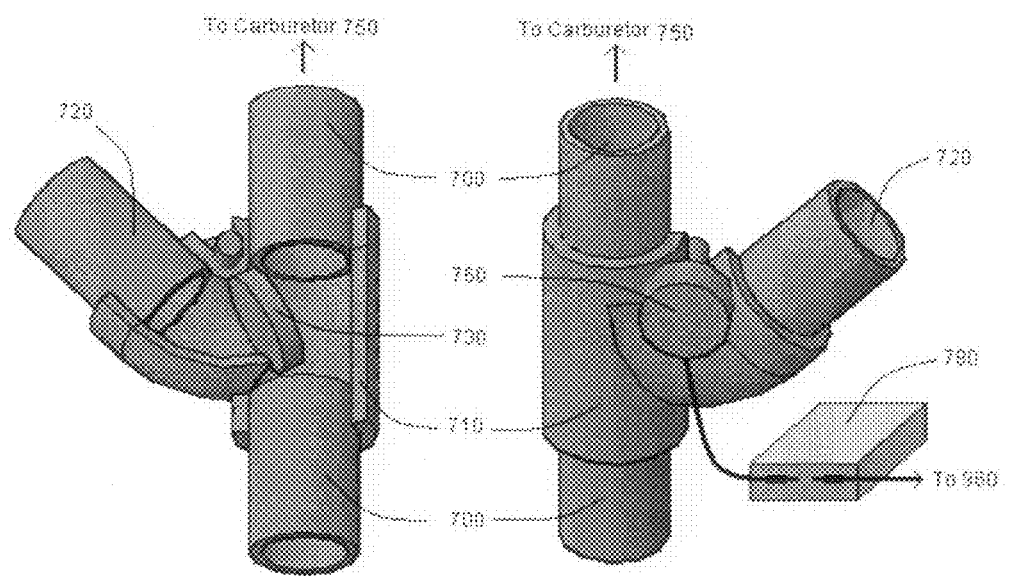
FIG. 9 is a partial cut-away view of a bypass-valve site inside of the branch.

There is a branch 710 located on the intake manifold 700A-B (see FIG. 9). One side of the branch 710 is open to air directly by a bypass 720, and another side of the branch 710 opens to carburetor 750. There is a bypass-valve 730 located inside of the branch 710. FIG. 9 is a partial cut-away view of the bypass-valve 730 sites inside of the branch 710.

The bypass-valve 730 has two positions, the position one is for working state, which opens the carburetor 750 to the intake manifold 700A-B and closes the bypass 720. That makes the air fuel mixture can goes into the combustion chamber. The position two is for un-working state, which closes the carburetor 750 and opens the bypass 720 to the intake manifold 700A-B, in order the combustion chamber open to outside directly.

The trigger 950 has two positions too, the position one is for working state, which the trigger goes up in order it able to trig the ratchet wheel 930. The position two is for un-working state, which the trigger goes down and cannot trig the ratchet wheel 930 after the valve 900 opened already.

The bypass-valves 730 and triggers 950 both are in either position one or position two in order to control the combustion chamber either in working state or in un-working state.

Figure 10:
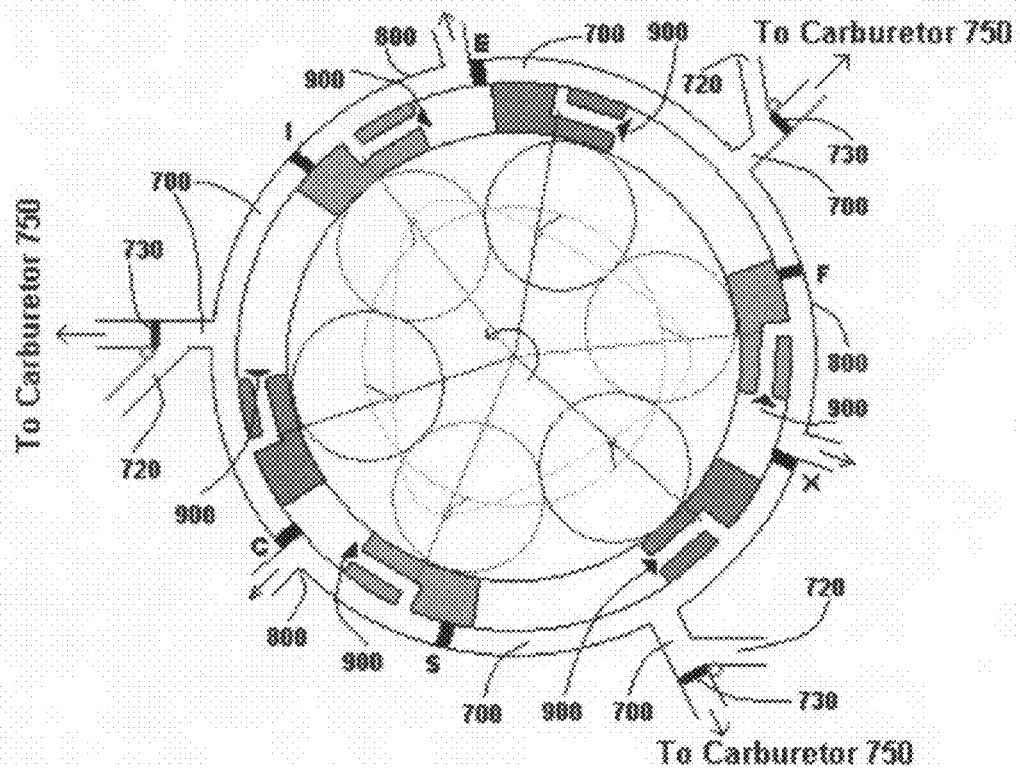
FIG. 10 shows all of the bypass-valves are in no-working positions, and all the valves are on opening.

So, if we don't want combustion chamber to work, after the valve opened and completed exhaust cycle, then never trigs the valve to close in order the combustion chamber to open through to outside by the bypass 720. The procedures are: Put the bypass-valve 730 into un-working state when combustion chamber gets any point I, S or F after exhaust cycle. This makes the combustion chamber goes through the opening valve 900 and the bypass 720 to outside; Put trigger 950 into un-working state when combustion chamber gets next point E, C or X, this keeps the combustion chamber remain open to outside through opening valve 900 and exhaust manifold 800A-B. FIG. 10 shows all of the bypass-valves 730 are in un-working positions, and all the valves 900 are in opening. And put all triggers 950, which sited at point E, C and X are in un-working state. That makes none of six combustion chambers can be in working state.

If some combustion chamber needs to put back into working state, the procedures are: When the combustion chamber gets any point of I, S or F put the bypass-valve 730 at that position in working state. That will make this combustion chamber starts the intake cycle. After intake cycle, the combustion chamber should move to points C, X or E, put the trigger 950 into working position. It will change the valve 900 from opening to closing, and compression cycle can be started. After compression cycle, the valve 900 still keeps closing situation since there is no trigger 950 located on points I, S and F. The ignition cycle can start. When the ignition cycle finished, the combustion chamber moves to the one of the points C, X or E, put the trigger 950 into working situation, which will open the valve 900 that was closed before. The exhaust cycle starts now.

It will be easier to make the triggers 950 and the bypass-valves 730 be controlled by using a readable medium storing programmable controller 780, an electromagnet 960 and an electrical motor 760.

Figure 11:
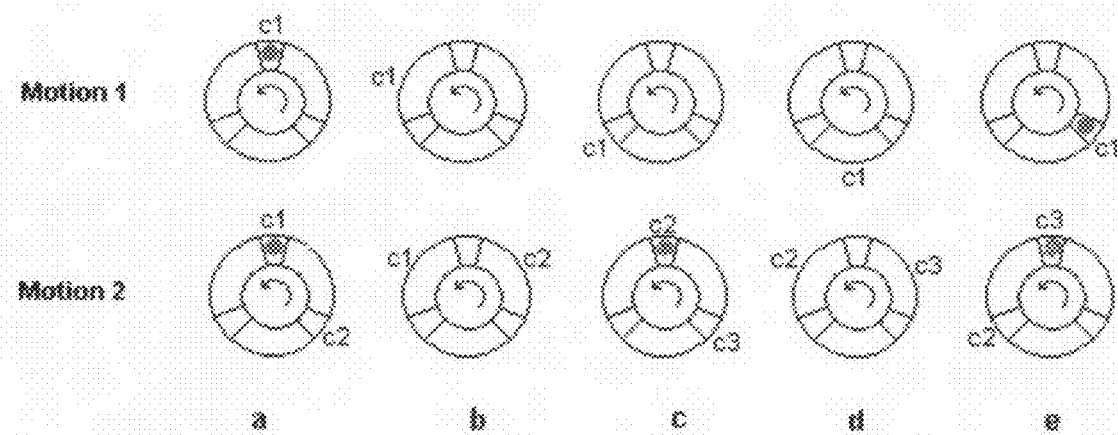
FIG. 11 is a schematic view of the motion control.

$R_r$3 engine has 6 combustion chambers. As motion control, each combustion chamber can be put into working or un-working state after it completes the forth stroke (Exhaust stroke). So it is possible to make a combination of any number that less or equal to 6 of the combustion chambers work in whole or partial housing circulation. As an example, to make only one combustion chamber works in whole housing circulation, it gets ignition every 240° of the hosing wheel in four strokes (FIG. 11, Motion 1). It is also possible to make every combustion chamber ignitions at 0° of the hosing wheel. Assume combustion chambers c1, c2 and c3 work together in this case. Lets put c2 into the intake stroke (assume it was not working before) when c1 gets at ignition stroke on 0° (FIG. 11 Motion 2 a). One stroke later c1 goes into exhaust cycle, and c2 goes into compression cycle (FIG. 11 Motion 2 b). Two strokes later, c2 gets ignition on 0°. Meanwhile we put c1 in un-working state, and put c3 (assume it was not working before) into intake cycle (FIG. 11 Motion 2 c). Three strokes later, c2 gets into exhaust stroke and c3 gets into compression stroke (FIG. 11 Motion 2 d). Four strokes later c3 gets ignition on 0° (FIG. 11 Motion 2 e).

The Conclusion of the General Cases for $R_r>2$

The basic parameters of the rational number $R_r$, the eccentricity d of the eccentric pins, the long axis H of the pistons, and the radius D of the housing ring (see FIG. 3) define the property of the engine, which are:

The engine has a pair of the planetary gearsets and each of the planetary gearsets has a big ring gear with radius R, $R_r$ rolling gears with radius r, and a sun gear with radius R-2r. The quotient R/r must equal to $R_r$.

The engine has a pair of the housing wheel halve and each of the housing wheel halve has a housing ring half, $R_r$ pistons, $R_r$ spokes and a hub. The angle difference between the 2 housing wheel halve is $\pi/R_r$. The engine has total $2R_r$ combustion chambers.

The minimum angle $\delta$ and maximum angle $\Delta$ between every two neighbored spokes are:

$$\delta=\pi/(R_r)-2d/(r(R_r-1)) \quad (6.1)$$

$$\Delta=\pi/(R_r)+2d/(r(R_r-1)) \quad (6.2)$$

The minimum space $S_{min}$ and maximum space $S_{max}$ between every two neighbored pistons are:

$$S_{min}=D\delta-2H \quad (7.1)$$

$$S_{max}=D\Delta-2H \quad (7.2)$$

The first embodiment $\Phi I$ suits only for the even number of the $R_r$ which is greater then 2. The $\Phi I$ has $R_r/2$ intake-exhaust manifolds, and the angle between of the two of the neighbor intake-exhaust manifolds is $720°/R_r$.

The second embodiment $\Phi II$ suits for the any number of the $R_r$ which is greater then 2. The $\Phi II$ has $R_r$ intake-exhaust manifolds, and the angle between the two of the neighbor intake-exhaust manifolds is $360°/R_r$. Each of the intake-exhaust manifolds has an angle $\delta$ between an intake block and an exhaust block. The $\Phi II$ also has $R_r$ triggers, and each one sites at the same angle as the exhaust block sitting.

The motion control is only working in second embodiment $\Phi II$.

What is claimed is:

1. A housing wheel engine comprising:
a first set of planetary gearset;
a second set of planetary gearset;
wherein each set of the planetary gearset further comprising:
a fixed big ring gear with a radius of the pitch circle being R;
$R_r$ of rolling gears with a radius of the pitch circle being r; and
a sun gear with a radius of the pitch being R-2r formed therein;
wherein the $R_r$ here is a rotational number that $R_r=R/r$;
wherein the $R_r$ rolling gears having an eccentric pin mounted on each of the rolling gears respectively formed therein;
wherein the eccentric pin having an eccentricity d from a center of the $R_r$ rolling gears;
wherein the eccentric pin having a hypocycloid running curve when the $R_r$ rolling gears rolling inside the ring gear;
wherein the sun gear having a spline hole located at the center;
wherein the $R_r$ rolling gears located inside of the big ring gear symmetrically about the center of the big ring gear;
wherein the sun gear sited in a middle of the planetary gearset;
the housing wheel engine further comprising:
a first housing wheel half;
a second housing wheel half;
wherein the first housing wheel half and the second housing wheel half further comprising:
a housing ring half;
$R_r$ pistons;
$R_r$ spokes; and
a hub formed therein;
wherein $R_r$ spokes mounted on the housing ring half evenly with one end, and another end mounted on the hub;
wherein $R_r$ pistons mounted inside of the housing ring half and located on the same location of the spokes;
wherein each of the spokes has a linear slot;
wherein the spokes of the first housing wheel half having an angle $180°/R_r$ to the neighbor spokes of the second housing wheel half;
wherein the first housing wheel half and the second housing wheel half face to each other and join together;
wherein the first set of planetary gearset joins with the first housing wheel half by fitting the eccentric pins on the $R_r$ rolling gears inside of the slot on the spokes; and the eccentric pins have farthest location from the center of the ring gear;
wherein the second set of planetary gearset joins with a second of housing wheel half by fitting the eccentric pins on the $R_r$ rolling gears inside of the slot on the spokes; and the eccentric pins having nearest location from the center of the ring gear;
a generally cylindrical driveshaft having first and second splines formed therein;
wherein the first and second housing wheel halves face to face pivotally mounted on a middle of the driveshaft between the first and second splines, and are able to spin freely around the driveshaft;
wherein the sun gear of the first planetary gearset pivotally mounted on the first splines of the driveshaft;
wherein the sun gear of the second planetary gearset pivotally mounted on the second splines of the driveshaft;
a first engine cover half;
a second engine cover half;
wherein the first engine cover half and the second engine cover half further comprising:
a bearing support; and
a big ring gear base;
wherein the bearing support locates at the axis of the engine cover half;
wherein the big ring gear base locates at the axis of the inside of the engine cover half;

wherein the big ring gear of the first set of the planetary gearset mounted on the first ring gear base;

wherein the big ring gear of the second set of the planetary gearset mounted on the second ring gear base; and wherein the two ends of the driveshaft are mounted on the bearing support respectively.

2. The housing wheel engine of claim 1 further comprising:

a toroidal housing ring and the first and the second housing wheel halves formed therein;

wherein the toroidal housing ring having an opening angle t;

wherein the toroidal housing ring having $R_r/2$ intake manifolds, $R_r/2$ exhaust manifolds, and $R_r/2$ spark plugs formed therein;

wherein the $R_r/2$ intake manifolds, the $R_r/2$ exhaust manifolds, and the $R_r/2$ spark plugs (or diesel injector plugs) are evenly mounted on the toroidal housing ring;

wherein the intake manifolds having a minimum angle $$\delta = \left(\frac{\pi}{R_r}(R-r) - 2d\right)\frac{180°}{(R-r)\pi}$$

or a maximum angle $\Delta = (720°/R_r) - \delta$ to neighbor exhaust manifolds;

wherein the spark plugs having an angle $\Delta/2$ to the neighbor intake manifold and exhaust manifold;

wherein each of the first housing wheel half and the second housing wheel half has an opening angle 180°−t/2 housing ring half and $R_r$ solider pistons;

wherein the first housing wheel half joins with a side of the toroidal housing ring by locating the spokes in the middle of intake and exhaust ports;

wherein the second housing wheel half joins with another side of the toroidal housing ring by the spokes having an angle $180°/R_r$ to the neighbor spokes of first housing wheel half.

3. The housing wheel engine of claim 1, further comprising:

the housing wheel with the two housing wheel halves formed therein;

wherein each of the first housing wheel half and the second housing wheel half have an opening angle 180°, a housing ring half, $R_r$ hollow pistons, and an $R_r$ valve system formed therein;

wherein the valve system includes a valve, a rocker, a push rod, a cam wheel, a ratchet wheel, and a trigger formed therein;

wherein each of the hollow pistons having an air tunnel goes from an end of the piston through out from the housing wheel half;

wherein the valve located on the each of the hollow pistons, and connected with the rocker located inside of the each of the hollow pistons, one end of the push rod connected with the rocker inside of the pistons, and another end connected with the cam wheel that mounted with the ratchet wheel together;

wherein a trigger sited on the ring gear base and located on the trace of the ratchet wheel;

wherein the spokes of the first housing wheel half having an angle $180°/R_r$ to the neighbor spokes of the second housing wheel half; and the first housing wheel half faces to the second housing wheel half to each other and join together; and an intake-exhaust manifold system having $R_r$ intake-exhaust manifolds therein:

wherein each of the $R_r$ intake-exhaust manifolds has an intake manifold, an exhaust manifold, an intake-block, and an exhaust block formed therein; and wherein the each of the $R_r$ intake-exhaust manifolds forms a circle, connects to the housing wheel halves on the air tunnel port location, and situates the exhaust-block on the same angle as the triggers.

4. The housing wheel engine of claim 3 wherein the engine includes a controller having a readable medium storing program to control the combustion chambers working in whole or partial housing circulation;

wherein the triggers have a trig rod and an electromagnet formed therein; the up rod is an able trig position, and down rod is an unable trig position;

wherein each of the intake manifolds has a branch, a bypass, a bypass-valve, and an electrical motor formed therein;

wherein one end of the branch connects to a carburetor and another connect to the bypass;

wherein the bypass-valve locates inside of the branch and either covers a bypass port or a carburetor port;

wherein the electrical motor moves the bypass-valve to open the bypass port and close the carburetor port, or to open the carburetor port and close the bypass port; and wherein the controller controls the movements of the bypass-valves and the triggers.

5. The housing wheel engine of claim 1, wherein both of a long axis of the pistons and the eccentricity d of the eccentric pins define compression rate and displacement of the engine.

6. The housing wheel engine of claim 1, further comprising a piston seal system having a plurality of the piston seals locate on each of the pistons; and further including at least one of:

a working angle of the piston seals is 180° when the toroidal housing ring is not adopted; and a working angle of the piston seals is 180°+t/2 when the toroidal housing ring is adopted;

wherein the t is the open angle of the toroidal housing ring and the range of the t is $0° \leq t \leq 360°$.

* * * * *